(12) United States Patent
　　　Sutton

(10) Patent No.: US 10,918,982 B1
(45) Date of Patent: Feb. 16, 2021

(54) MANUALLY DETACHABLE ENCLOSURE FOR REPLACEABLE FILTER ELEMENTS AND THE LIKE

(71) Applicant: Jepson Sutton, Phoenix, AZ (US)

(72) Inventor: Jepson Sutton, Phoenix, AZ (US)

( * ) Notice: Subject to any disclaimer, the term of this patent is extended or adjusted under 35 U.S.C. 154(b) by 20 days.

(21) Appl. No.: 16/160,983

(22) Filed: Oct. 15, 2018

(51) Int. Cl.
　　　*B01D 35/30*　　(2006.01)
(52) U.S. Cl.
　　　CPC ........ *B01D 35/30* (2013.01); *B01D 2201/302* (2013.01); *B01D 2201/304* (2013.01); *B01D 2201/305* (2013.01); *B01D 2201/306* (2013.01); *B01D 2201/307* (2013.01)
(58) Field of Classification Search
　　　CPC .............. B01D 35/30; B01D 2201/304; B01D 2201/306; B01D 2201/305; B01D 2201/302; B01D 2201/307

USPC ........ 210/450, 440–445, 455, 282; D23/207, D23/209, 365
See application file for complete search history.

(56) References Cited

U.S. PATENT DOCUMENTS

2012/0318725 A1\* 12/2012 Tseng ..................... B01D 35/30
　　　　　　　　　　　　　　　　　　　　　　　　　　210/232

\* cited by examiner

*Primary Examiner* — Madeline Gonzalez

(57) ABSTRACT

An apparatus and method for using a detachable sealed enclosure for containing and quickly accessing filter elements and the like without the use of tools and without the possibility of initial or subsequent over tightening. A first set of paired protrusions receive lateral pinch forces which draw the enclosure into a sealed connection with a lid while selectively compressing a seal between these components. A second set of paired protrusions receive lateral pinch forces which release the sealed connection, providing access to the enclosure content.

19 Claims, 13 Drawing Sheets

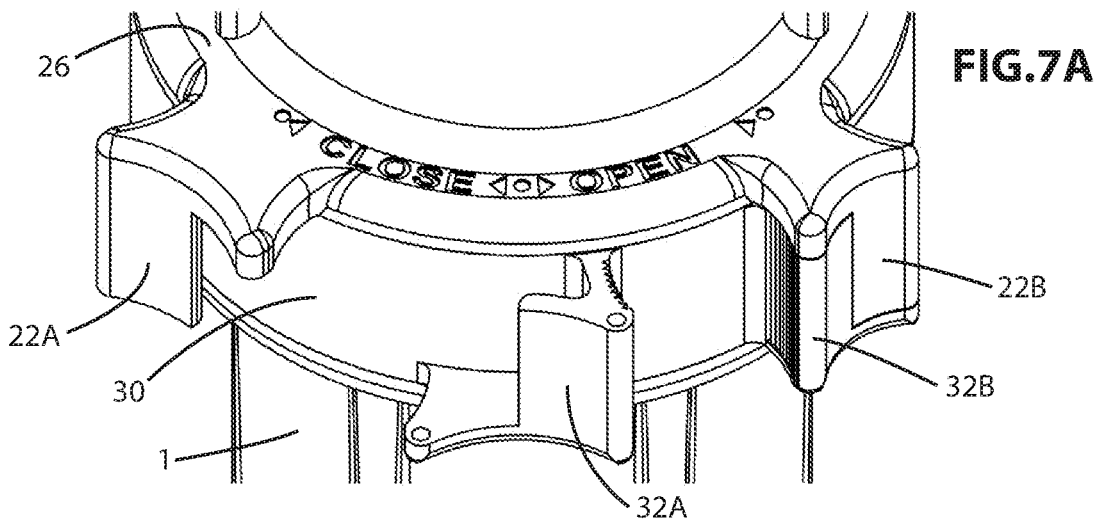
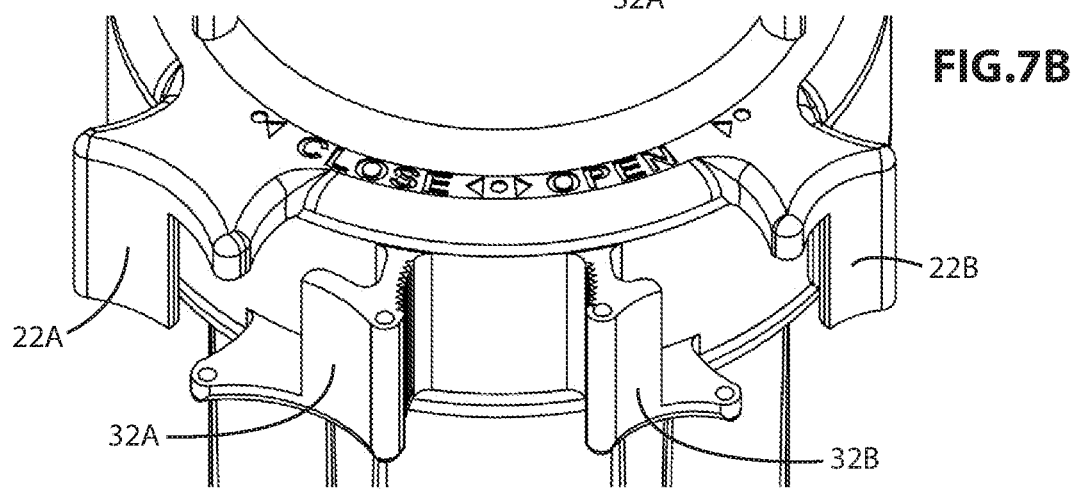
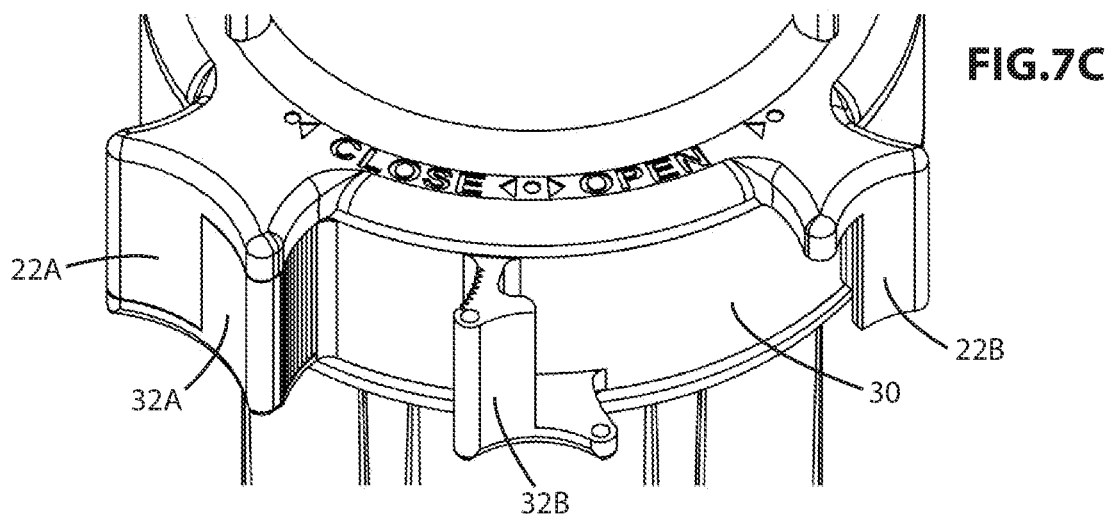

MANUALLY DETACHABLE ENCLOSURE FOR REPLACEABLE FILTER ELEMENTS AND THE LIKE

I. BACKGROUND

A. RELATED APPLICATION

This application is related to co-pending application entitled "Quick Change Filter Housing" that was filed Jun. 3, 2017 and assigned Ser. No. 29/606,366 (now U.S. Pat. No. D832,394, issued Oct. 30, 2018). The disclosure in application Ser. No. 29/606,366 as filed on Jun. 3, 2017 is incorporated herein by reference.

B. FIELD OF INVENTION

The invention described in the present application relates to a detachable enclosure that in one preferred embodiment is used to contain and support a replaceable filter within a directed flow of water to be filtered prior to use; more particularly, the present invention relates to a container having manually detachable sections that allow for the quick removal and replacement of an enclosed filter element without the use of tools.

C. PRIOR ART FILTER CONTAINERS AND ASSEMBLY/DISASSEMBLY MECHANISMS

There are tens of thousands of patents describing various forms of enclosures, containers and housings adapted to receive filter elements used to treat different fluids, in different applications and under different operating conditions. For example there are over 2600 patents just in U.S. Class 210 (the primary class for patents directed to water treatment apparatus) subclass 232 (the subclass for patents related to the means to secure parts of a water treatment apparatus in operative relation or to aid in assembling or disassembling the apparatus). While the container of the present invention may find many applications, including in the filtration, containment or treatment of various fluids, the preferred embodiment of the described herein is for the containment and support of a replaceable filter element within a flow of water and more particularly, a container that can be opened and closed without the use of tools and can be installed for use on a vertical or horizontal surface.

Containers for replaceable water filters are designed for in-line use, with an inlet to receive incoming water under pressure and an outlet to convey filtered water to a faucet or other point of use. When installed, the filter container may be physically supported in a number of ways, including: (a) by connection to an adjacent wall or other existing structure (e.g., prior art FIG. 1A); or, (b) by connection in series or to a shared manifold or to other system components (e.g., U.S. Pat. No. 10,040,005); or, (c) by placement on a countertop or other horizontal surface (e.g., U.S. Pat. No. 8,561,809).

As shown in prior art FIG. 1A, most enclosures used as containers for replaceable filter element consist of three basic components: The first basic component is a lid and distribution structure (A) for receiving and directing the flow of incoming water through the filter element and then from the filter element out of the housing to a point of use. The second basic component is an enclosure (B) for retaining the filter element in functional relation to the flow pattern produced by the lid and distribution structure A. The third basic component is a seal (C) between the lid (A) and the enclosure (B) to prevent leakage from the housing after assembly and during use. Filter housings also typically include some mounting structure such as the wall mount (D) shown in FIG. 1A. Other prior art filter housings are designed to stand on a base supported by a flat surface (e.g. U.S. Pat. Nos. 8,561,809 and 9,636,612).

The vast majority of commercially available filter housings—as exemplified in the prior art FIG. 1A—are generally cylindrical in form and the lid or distribution structure (A) is detachably connected to the enclosure structure (B) by mating threads (E) along edges or surfaces where the two structures are joined. An o-ring seal (C) is typically placed between the two structures (A, B) and this seal (C) is compressed as the threaded connection between the two components is tightened. When sufficiently compressed, the seal (C) resiliently fills the gap between the two solid components and resists leakage from the container under conditions of intermediate internal pressure and pulsing.

Other prior art filter housings have an internally threaded collar that is rotationally retained by a circumferential flange extending from one of the basic components (A or B) and this treaded collar is detachably connected to exterior threads on the other component (e.g., U.S. Pat. Nos. 6,635, 175 and 4,935,134). Turning the threaded collar draws the two components into tight connection while compressing an o-ring or other seal between them. Still other enclosures include covers, bases, lids or other detachable components that are joined by integral or collar-mounted, bayonet-type mechanisms consisting of short thread-like segments that allow the connection between the two components to be quickly engaged and disengaged (e.g., U.S. Pat. Nos. 8,561, 809, 6,001,249, 5,394,601 and 8,246,055).

D. PRIOR ART PROBLEMS

In practice, the opening and closing of prior art filter housings of the type shown in FIG. 1A has required the use of a special wrench (F). One of many different wrench configurations is shown separately in FIG. 1B and is shown in FIG. 1A engaged with the protrusions (G) spaced around the side of enclosure (B). An image search on the phrase "water filter wrench" produces hundreds of different configurations with different engagement protrusions (H) or recesses (I) and many different inside diameters for use with an equally wide range of prior art housings (e.g., U.S. Pat. No. D 644,897). Wrenches of this type have been required to tighten, but more importantly, to loosen the threaded connection (E) between the detachable enclosure structure (B) and the cover structure (A). Consumers often complain about losing or breaking plastic filter wrenches, which are used only infrequently when changing a filter.

Depending on their physical size and strength, users will tighten the threaded connection (E), either by hand of by use of a wrench (F) of the type shown in FIGS. 1A and 1B. To be confident that the o-ring is sufficiently compressed to avoid leakage, users often over tighten the treaded connection (E). Even when over tightening does not occur during installation, pulse tightening frequently occurs over time. This pulse tightening is caused by hydraulic transients (water hammer) in the form of pressure spikes that vary in amplitude and occur with different frequency in different water systems depending on pipe diameter and length, system pressure, flow velocity and rigidity of the system components.

Water hammer occurs when water flow is suddenly disrupted by, for example, valves being closed quickly or by pumps being turned off. When water hammer pulses are transmitted through a system, filter housings will expand and contract in proportion to the amplitude and duration of the pressure spike. When a prior art filter housing of the type shown in FIG. 1A is subjected to a pulse of this kind, the component volumes on either side of the treaded connection (E) expand. At the end of the pulse, the component volumes will contract; causing the threaded connection (E) to incrementally tighten. Depending on the water system involved, the filter housing may be exposed to little or no water hammer; or water hammer may be a frequent occurrence, subjecting the housing to hundreds or thousands of pulses each month. Pulse tightening of the threaded connection (E) will make it harder to loosen and remove the enclosure (B). The torque required to remove the enclosure (B) will be higher than the torque used to initially tighten the enclosure against leakage. Wrenches of the type shown in FIG. 1B are employed for this purpose, making the process of changing a filter element more much more difficult and cumbersome.

In cases where the threaded connection (E) is over tightened during installation or has incrementally tightened over time due to water hammer, it may be necessary to apply substantial force to the wrench (F) in order to rotate the enclosure (B) in relation to the fixed lid or distribution structure (A). This twisting force can caused the wall mount (D) to loosen, separate or detach from the wall to which it is connected by screws (J), nails or other fasteners.

The threaded connection (E) that characterizes most prior art commercial housings, has an additional disadvantage: when the connection is tightened there is circumferential displacement between the enclosure B and the lid A which subjects the o-ring seal C to significant shear forces from one side of the seal to the other, resulting in unpredictable cross sectional distortions and residual elastic energy in the seal itself.

E. OBJECTS OF THE INVENTION

One object of the present invention is to provide a detachable enclosure to contain a periodically accessed item such as a replaceable filter element, the enclosure comprising structures that can be quickly and easily attached and detached in sealed relation without the use of tools and without initial or subsequent over tightening.

Another object of the invention is to provide such an enclosure in which the seal between the detachable components is achieved solely through axial compression without imposing material circumferential shear forces or displacement.

Another object of the invention is to provide such an enclosure that is capable of easy and precise mounting on a wall while also being adapted for free standing support on a horizontal surface such as a countertop.

A further object of the invention is to provide an enclosure specifically adapted for containing and supporting a replaceable filter within a contained and directed flow of a fluid such as water.

F. SUMMARY OF THE INVENTION

In one embodiment, the present invention is for a re-sealable enclosure particularly adapted to receive a filter element and to support that filter element within a contained flow of water directed into and through the filter by a lid that includes a water distributor connected to a mounting structure. The lid detachably connects to the enclosure while acting to compress a seal located in opposing seats on the connected elements. In operation, a plurality of pins on the enclosure is engaged within a corresponding plurality of slots on the lid. A plurality of wedges on a separator is advanced between corresponding pins on the enclosure and a flange on the lid to force the pins away from the flange thereby compressing the seal to substantially prevent leakage from the enclosure. The mounting structure and the separator include paired protrusions that are configured to be manually engaged by a user and to receive lateral pinch forces (a) to draw a first paring of the protrusions together and to thereby compress the seal to a predetermined extent and (b) to draw a second pairing of the protrusions together and to thereby release the seal from compression and allow disengagement of the lid from the enclosure to allow replacement of the filter contained within the enclosure.

G. DESCRIPTION OF THE DRAWINGS

In FIG. 6A the lid and enclosure are axially aligned for engagement.

FIG. 7A is a detailed view of the embodiment of FIG. 2 with the paired protrusions from the mounting structure and from the separator shown in the fully open position depicted by the wedge location shown in FIG. 6C.

FIG. 7B is a detailed view of FIG. 7A with the paired protrusions in their intermediate positions depicted by the wedge location in FIG. 6E.

FIG. 7C is a detailed view of FIG. 7B with the paired protrusions in their fully closed position depicted by the wedge location in FIG. 6F.

In FIG. 10A, the closest paired protrusions are shown in the fully open position depicted by the location of the wedge in FIG. 6C.

FIGS. 11A through 11F generally illustrate alternative seals for placement between the opposing seats on the enclosure and on the lid.

Figures 1A, 1B:
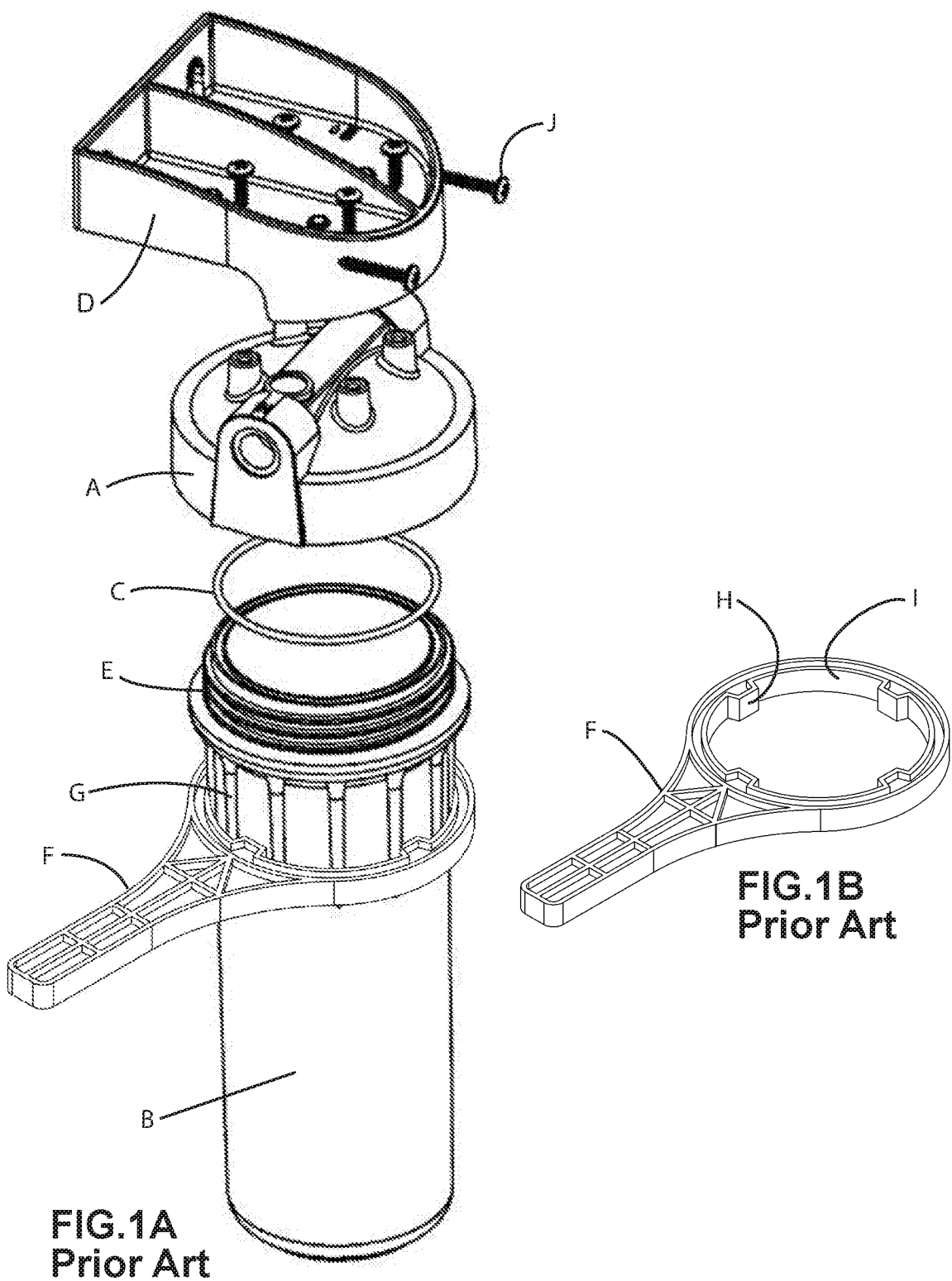
FIG. 1A is an exploded perspective view of a prior art enclosure for a replaceable inline filter, including a wall mount and a wrench for use in loosening and removal of the enclosure to allow filter replacement.
FIG. 1B is a perspective view of the prior art wrench that is shown engaged with the filter housing in prior art FIG. 1A.
Figures 2, 3:
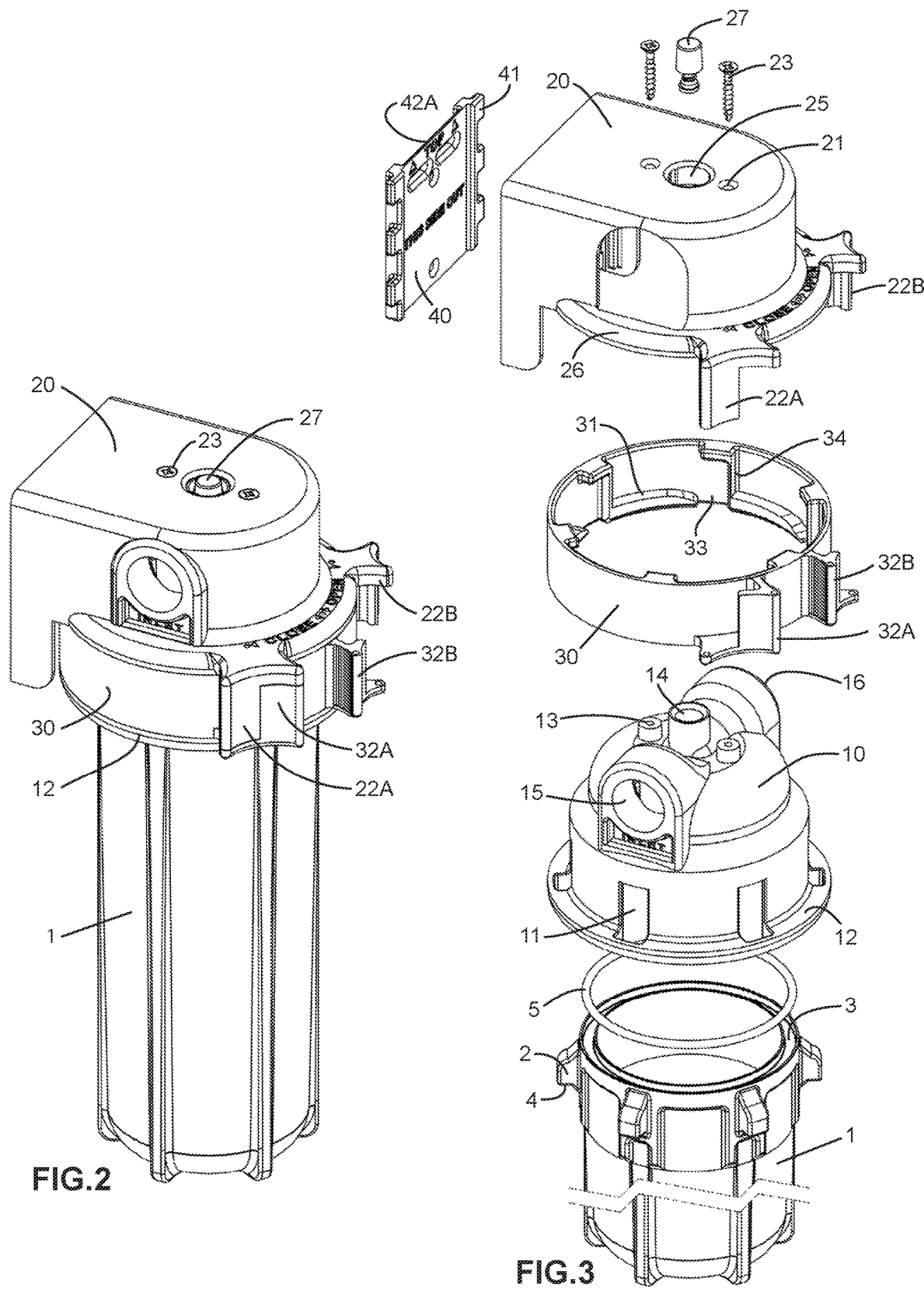
FIG. 2 is an assembled perspective view of one embodiment of the present invention in the form of filter container or housing having an enclosure that is quickly and easily detachable from a lid and fluid distributor through application of manual pinching forces between paired protrusions.
FIG. 3 is an exploded perspective view of the container embodiment shown in FIG. 2.
Figure 12:
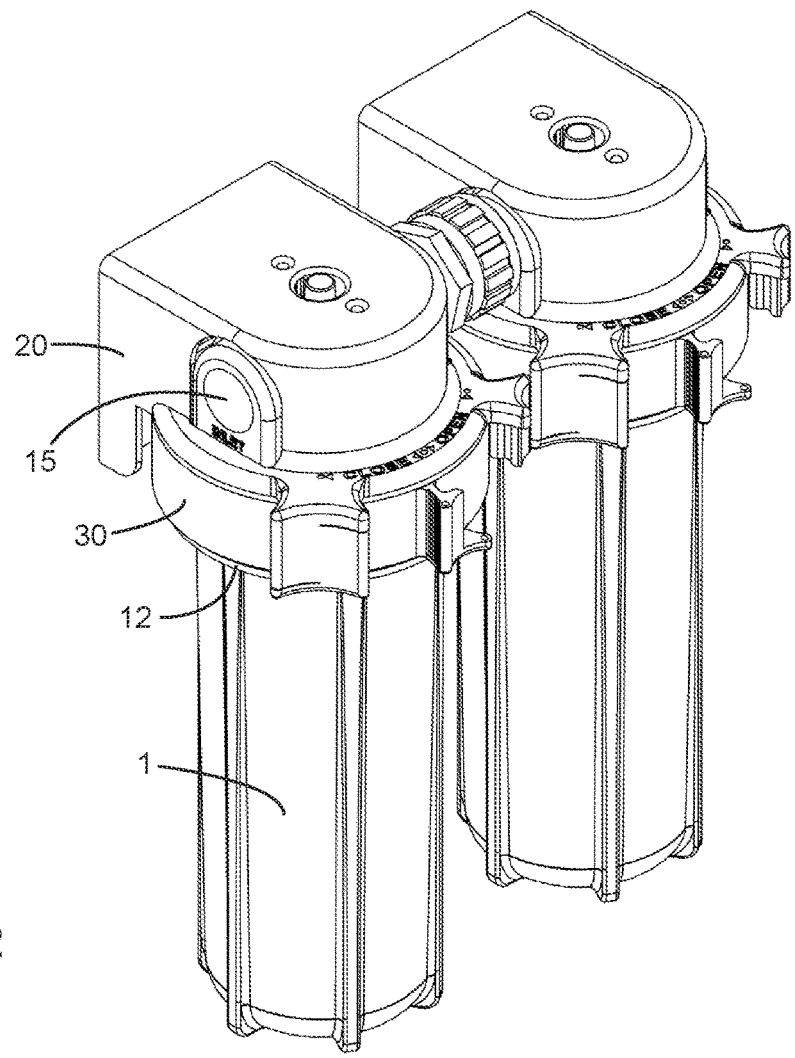

FIG. 12 is a perspective view of two filter housings of the type shown in FIG. 2 connected in series for use in a multi-stage treatment system.

Figure 13A:
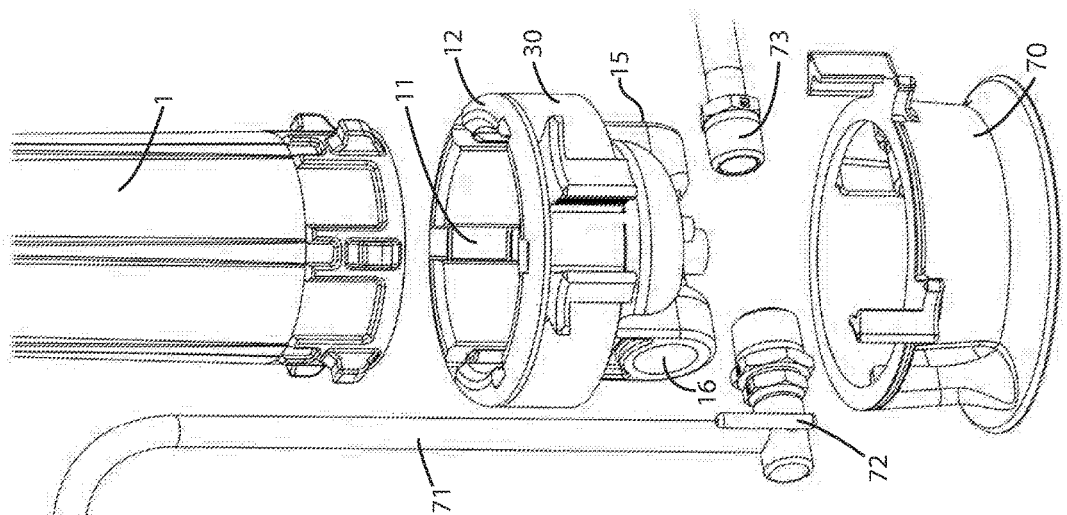

FIG. 13A is a perspective view of a countertop version of the filter housing illustrated in FIGS. 2 through 8 in which the mounting structure is configured as a base to receive the same components otherwise shown in FIG. 3.

Figure 13B:
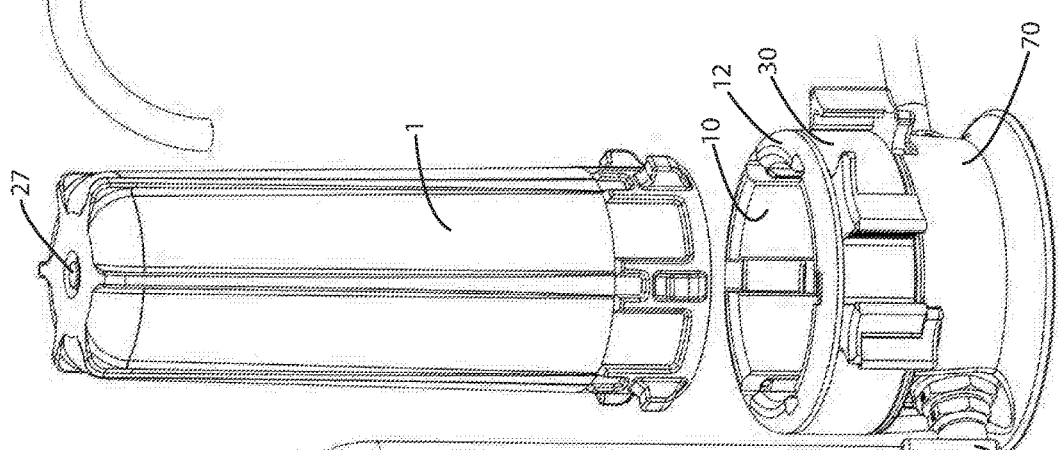

FIG. 13B is the view of FIG. 13A with the enclosure disconnected and axially separated from the lid which is connected to the base mounting structure.

Figure 13C:
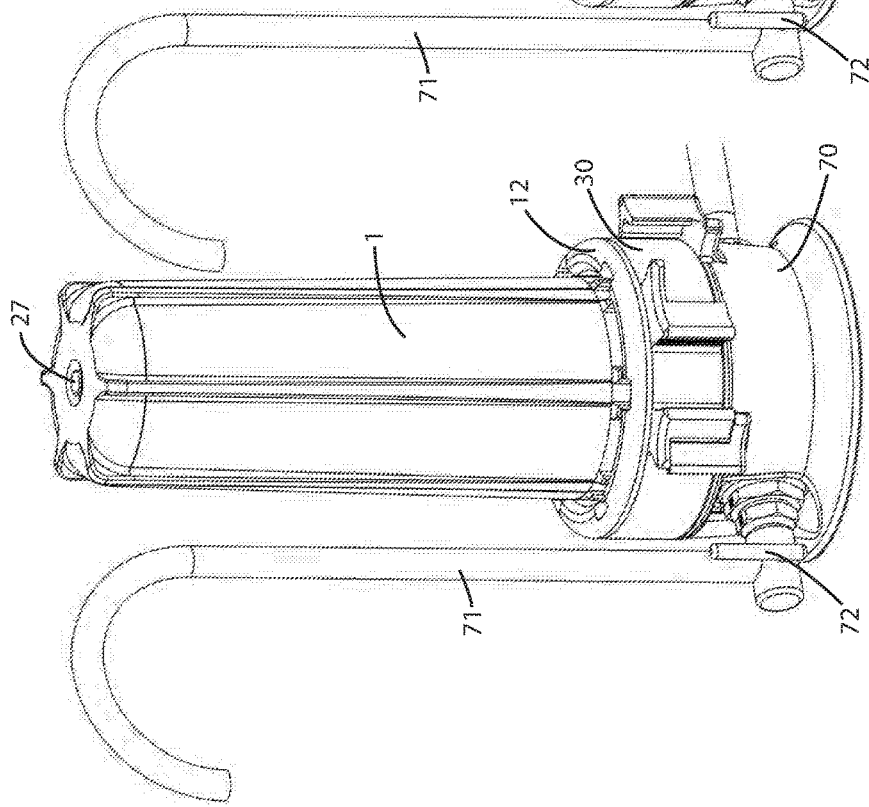

FIG. 13C is the view of FIG. 13B with the lid and separator disconnected from the base mount for better viewing of their interrelationship.

Figure 14A:
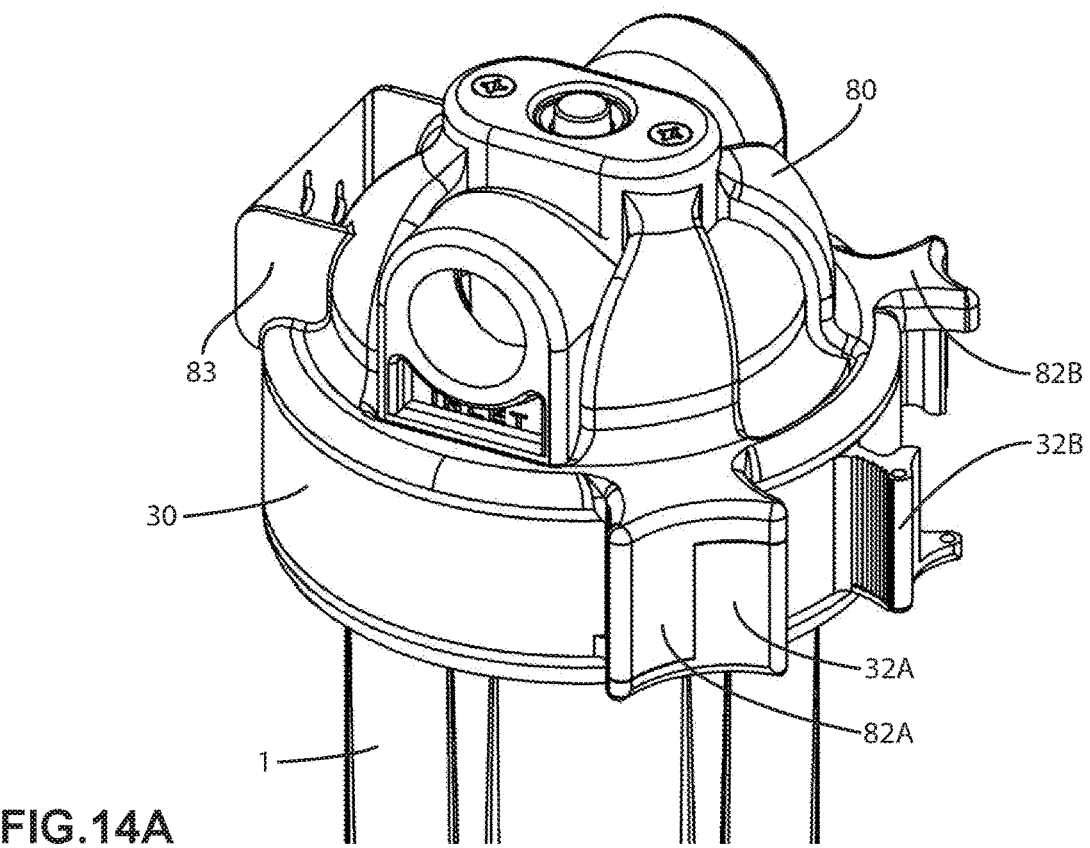

FIG. 14A is a detailed perspective view of the filter housing of FIGS. 2 through 8 with a modified mounting structure that does not substantially cover the lid/distributor but instead provides a minimal structure for firmly interconnecting the lid to the two pinch tabs and an integral wall bracket.

Figure 14B:
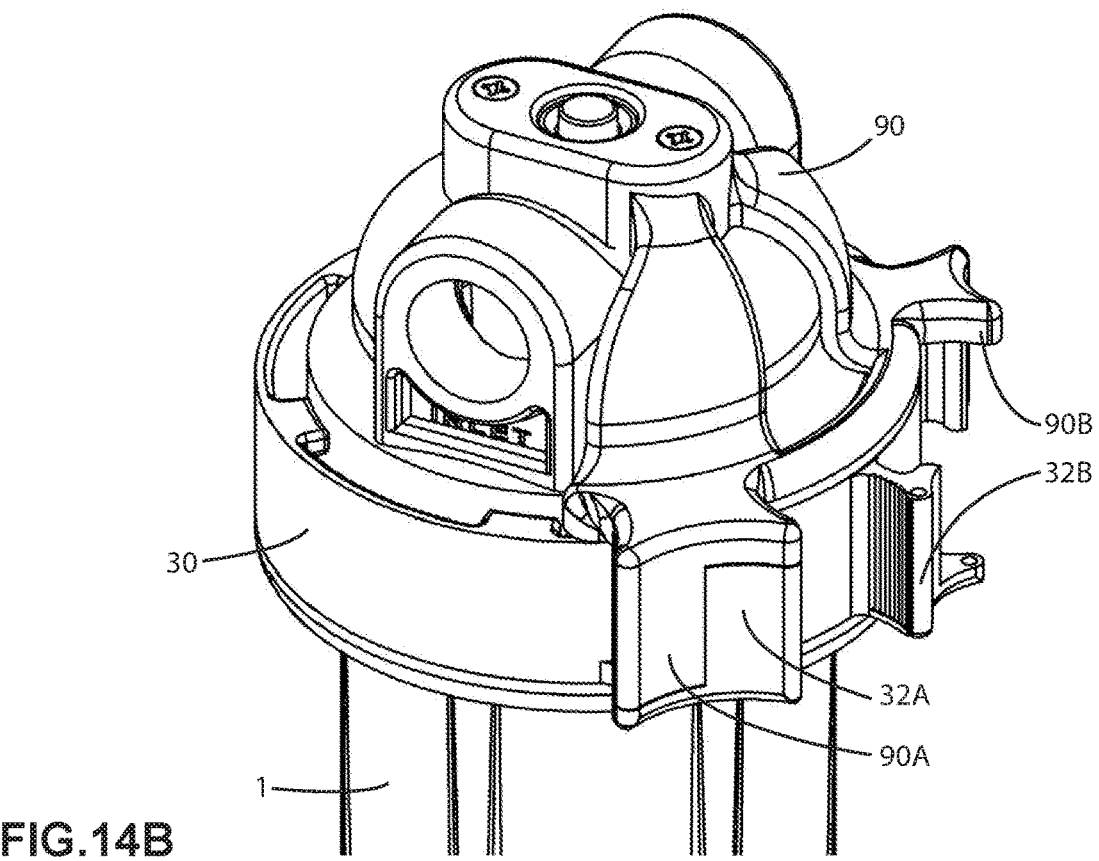

FIG. 14B is the view of FIG. 14A, without an integral wall bracket, for applications in which the filter housing does not require support or where the housing is supported by structural fluid connection to other fixed system components.

II. DETAILED DESCRIPTION

Figure 8:
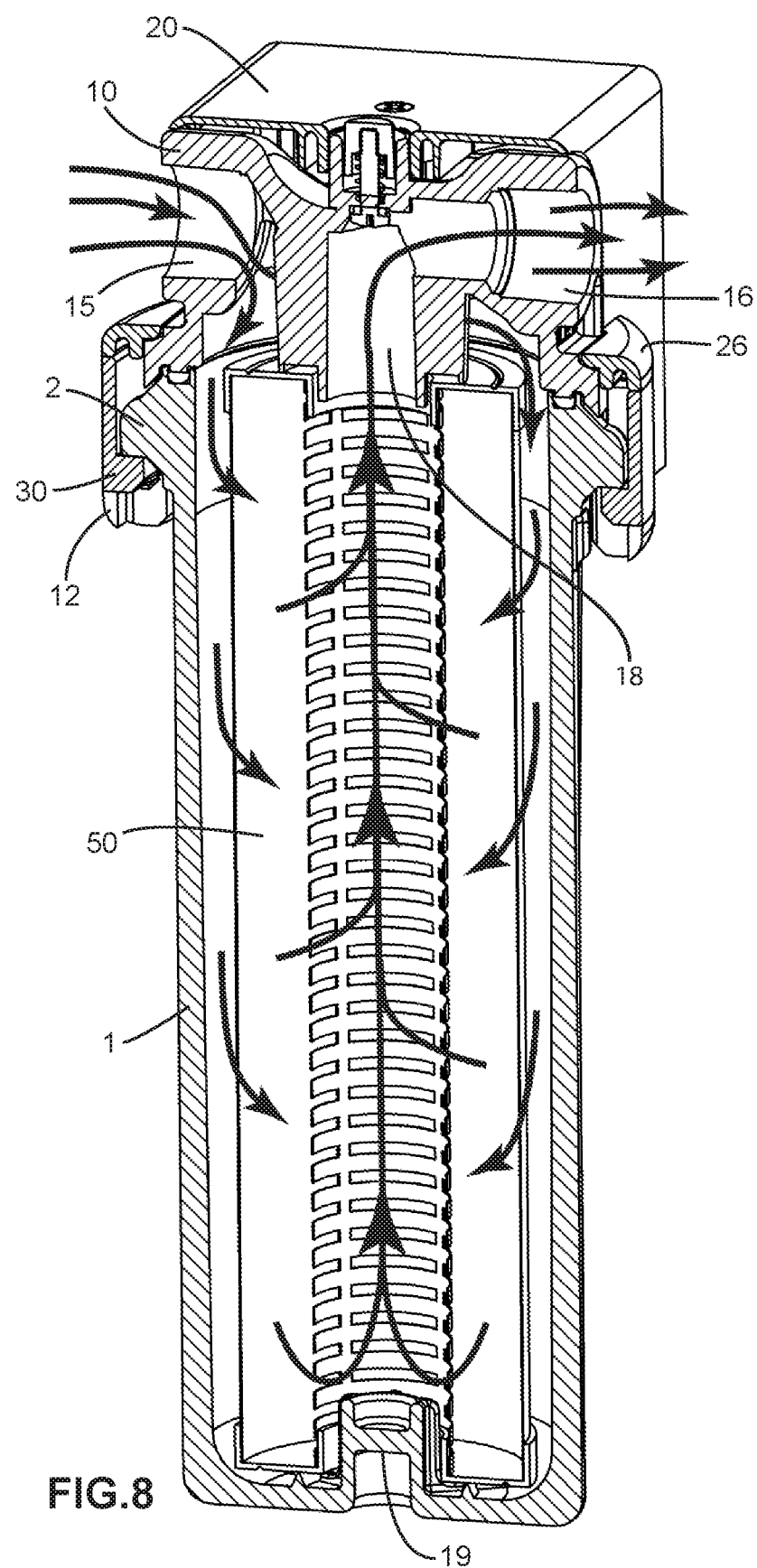
FIG. 8 is a sectional view of the embodiment shown in FIG. 2 taken through a plane through center of the inlet and outlet ports and showing the directed flow of liquid into and through a filter element supported within the enclosure.

FIG. 2 is an assembled perspective view of one of the more useful and complex embodiments of the invention, namely a replaceable filter housing which is capable of being quickly opened and closed manually without the use of special tools and without the possibility of over tightening. FIG. 3 shows an exploded perspective view of the housing of FIG. 2, without an enclosed replaceable filter. FIG. 8 shows a sectional view of the FIG. 2 housing with an enclosed filter element 50. The housing shown in FIGS. 2 and 3 includes the following basic components:

An enclosure 1, which includes six radial pins 2 extending from the open end of the enclosure 1. The enclosure 1 also includes a recessed seat 3A designed to receive a seal 5.

A closure or lid 10 (best shown in FIG. 3) includes six slots 11 which are configured to receive the six corresponding pins 2 when the lid 10 is engaged over the open end of the enclosure 1. The lid 10 also includes a load bearing circumferential flange 12. As best shown in FIG. 8, the lid 10 incorporates internal channels for distributing the flow of water received under pressure at the inlet 15 and directing the flow around and through an enclosed filter element 50 and through the outlet 16 to a point requiring filtered water. The arrows in FIG. 8 generally indicate the pattern flow through the filter housing.

A mount structure 20 is connected to the lid 10 by screws 23 that extend through a pair of holes 21 and are threaded into a corresponding pair of bosses 13 that extend from the outer surface of lid 10. The bosses 13 constrained in corresponding bores 24 (best shown in FIG. 4A) on the inside of the mount 20. An optional pressure relief valve 27 may be incorporated by drilling out and tapping an otherwise closed aperture 25 at the center of the lid 10. When installed, the contact button on valve 27 extends through the aperture 25 at the center of the mount 20.

Figure 4A:
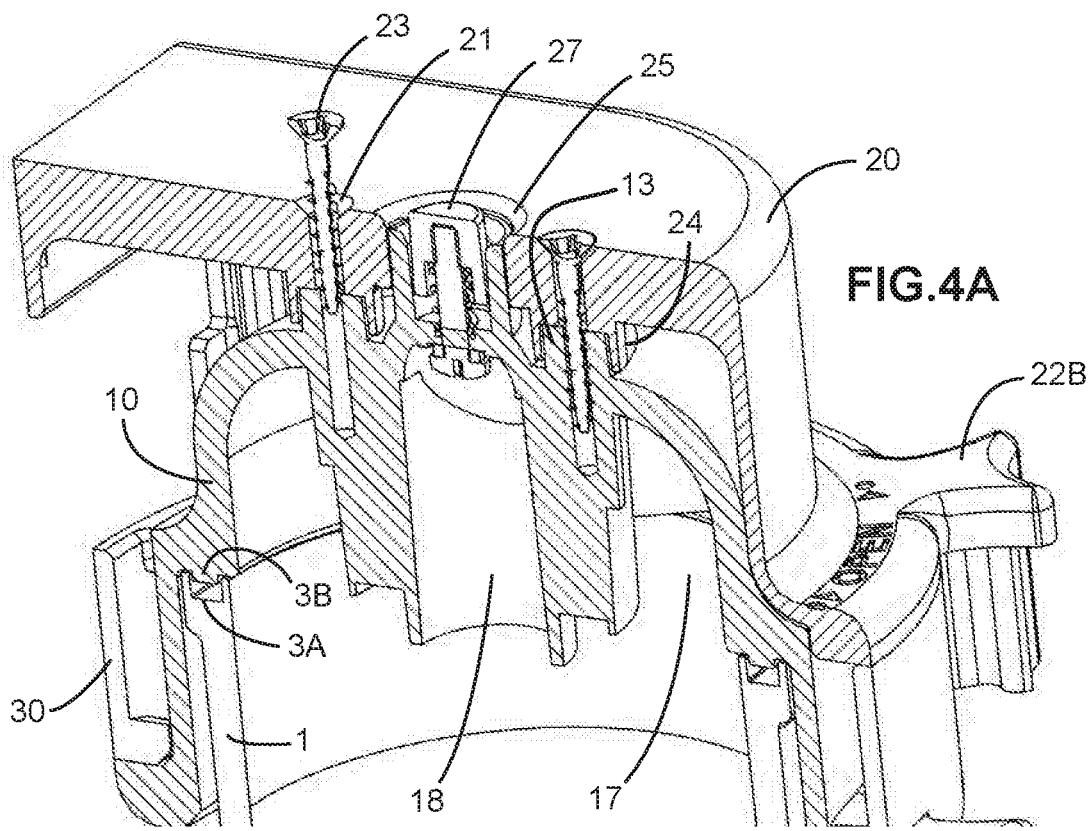
FIG. 4A is close up sectional view of the upper portions of the filter enclosure shown in FIGS. 2 and 3, with the mounting structure secured to the lid and distribution structure with the seal omitted for clarity.

As best shown in the sectional view of FIG. 4A, when the mount 20 is fully engaged on the lid 10, the holes 21 are aligned with corresponding holes in bosses 13 on lid 10 and the bosses 13 extend into two shallow sleeves 24 extending from the inner surface of the mount 20. When the bosses 13 are within the sleeves 24, the lid 1 cannot rotate with respect to the mount 20. Because the holes 21, bosses 13 and sleeves 24 are symmetrical about the center axis of the enclosure, the mount 20 can be connected to the lid 10 in two diametrically opposite orientations with respect to the inlet and outlet ports 15 and 16. This allows installation of the filter housing with the inlet 15 oriented toward the pressurized source of water, thus simplifying the plumbing connection to the inlet 15. As seen in FIGS. 2 and 3, the mount 20 also includes two radial protrusions or finger tabs 22A and 22B that, as described below, are manually engaged by the user in opening or closing the filter housing.

A separator or collar 30 includes six low-angle wedges 31 each of which spatially corresponds to one of the six pins 2 on the enclosure 1. At the leading edge of each of the six wedges 31 is a recess 33 that allows a corresponding pin 2 to pass through as the collar 30 is axially engaged over the open end of the enclosure 1. At the end of each of the six wedges 31 is a stop 34 that limits the extent that each wedge 31 can be advanced in relation to the corresponding pin 2. When the housing of FIGS. 2 and 3 is assembled, the collar 30 rotates around the outer perimeter of the lid 10 and rides on the flange 12.

As shown in FIGS. 2 and 3, the collar 30 includes two radial protrusions or finger tabs 32A and 32B that are manually engaged in opposition to the paired tabs 22A and 22B on the mount structure 20 to cause clockwise or counterclockwise rotation of the collar 30 in relation to the mount 20 and the connected lid 10. Rotation of the collar 30 in one direction advances the wedges 31 into engagement between the flange 12 on the lid 10 and the load bearing surface 4 of the pins 2 on the enclosure 1. Rotation in the opposite direction withdraws the wedges 31 from between the pins 2 and the flange 12. As further described below, FIGS. 7A through 7C provide close up perspective views of the two paired sets of tabs (22A-32A and 22B-32B) which are pinched together to either close or to open the filter housing of FIGS. 2 and 3.

Figure 5:
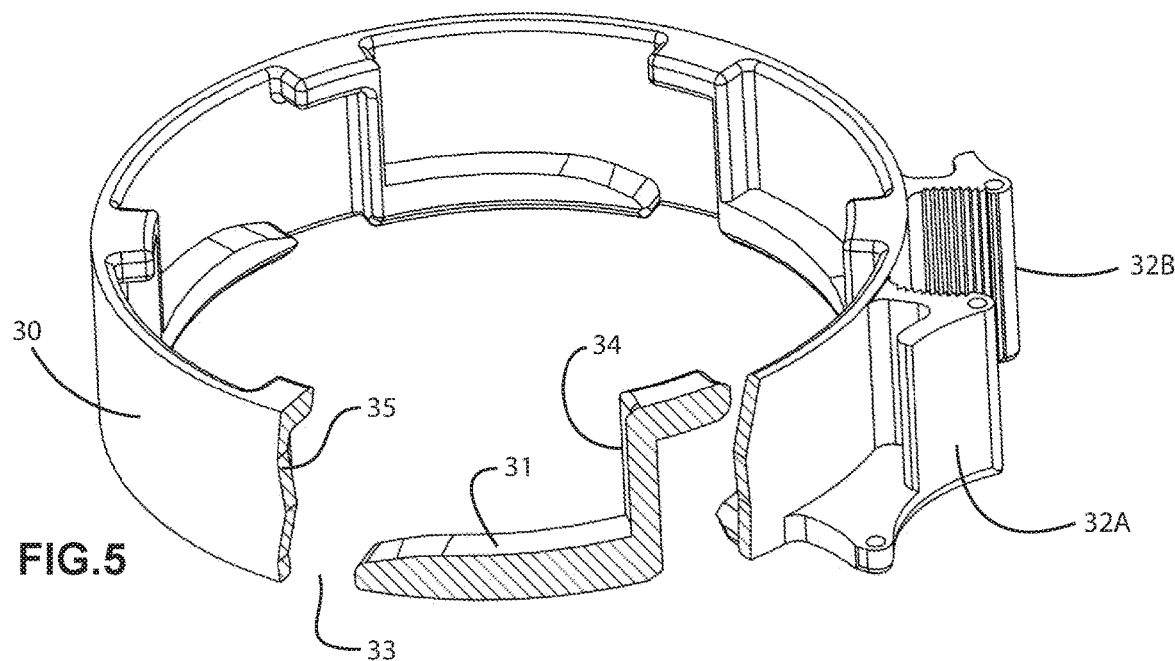
FIG. 5 is a perspective view of the collar or separator shown in FIG. 2 with a portion of the outer wall cut away to show the location of a representative wedge and the corresponding stop.

FIG. 5 is a perspective view of the collar 30 with a section of the outer wall 35 partially cut away to show the position of one of the wedges 31 in relation to the other elements of the collar 30, including the recess 33 and the stop 34. This cutaway version of the collar 30 is incorporated in FIGS. 6A through 6F to allow better visualization of the process by which the collar 30 is rotated to advance or withdraw the wedges 31 between the flange 12 on the lid 10 and the lower bearing surface 4 the pins 2 on the enclosure 1. FIGS. 6A through 6F show the lid 10 assembled with, and essentially covered by, the mount 20. The collar 30 is axially retained for rotation between the flange 12 on lid 10 and the circular skirt 26 on mount 20. FIGS. 6A through 6F show progressive steps by which the enclosure 1 is engaged with and locked onto the lid 10.

Figure 6A:
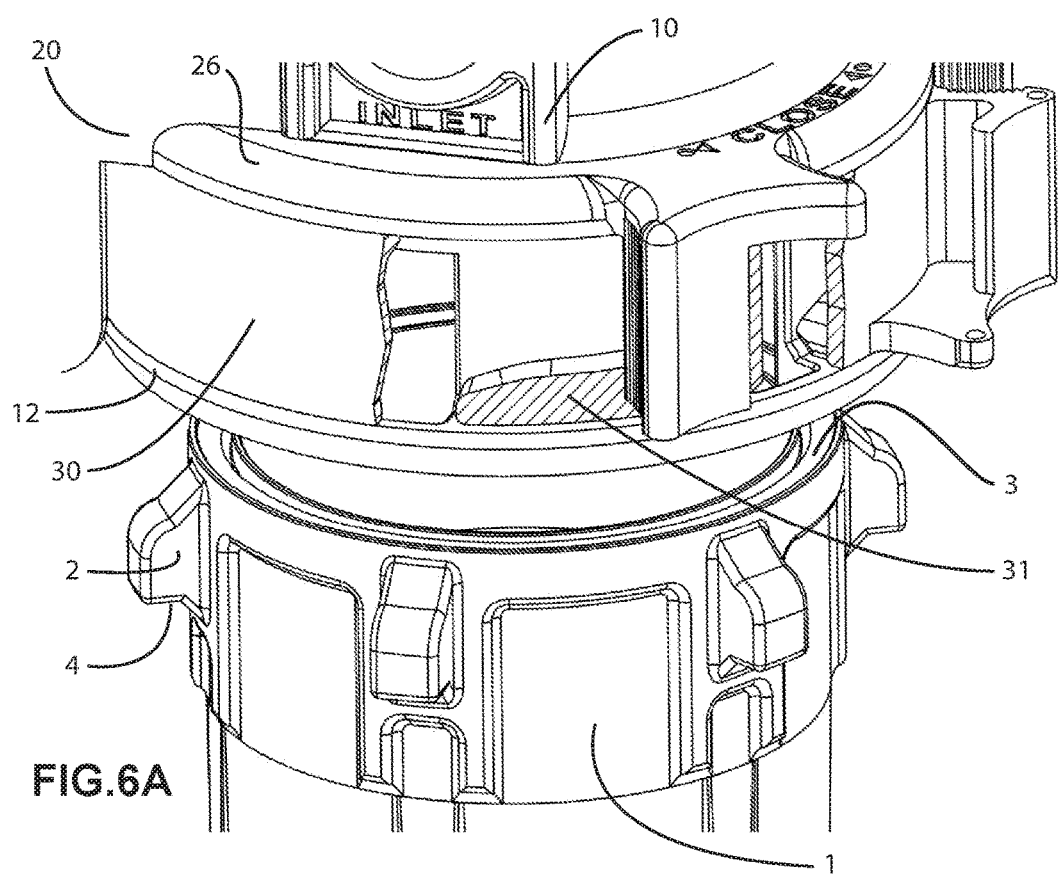
FIG. 6A is a perspective view of the upper portion of the embodiment shown in FIGS. 2 and 3 modified to incorporate the cutaway version of the separator shown in FIG. 5 to allow visualization of the spatial relation between one of the pins on the enclosure and the exposed wedge on the inner surface of the separator.

Referring to FIG. 6A, the lid 10 and the attached mount 20 are aligned with the open end of enclosure 1 for axial engagement. The pins 2 with their load bearing surfaces 4 are aligned with their corresponding slots 11 on the lid 10. One of the wedges 31 is visible through the cutaway portion of collar 30. For clarity, seat 3A is shown without the seal 5 (FIGS. 3 and 4B), which would be retained in the seat 3A when the enclosure 1 is connected to the lid 10.

Figure 6B:
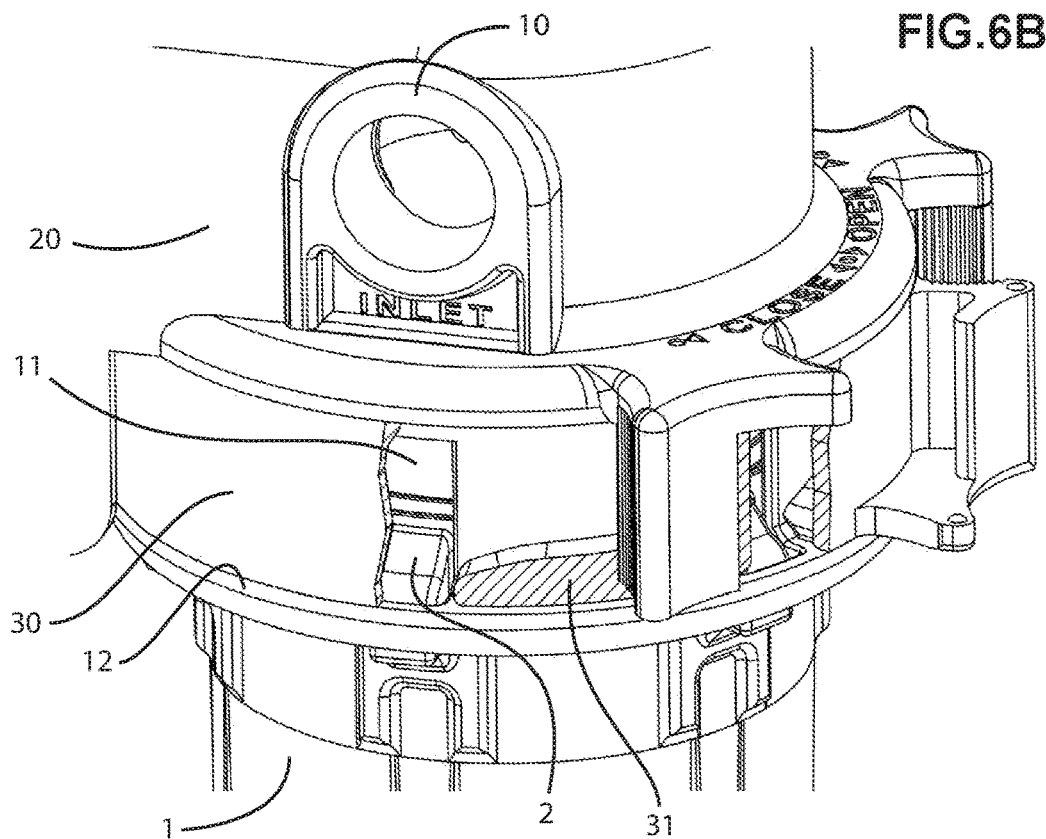
FIG. 6B is the view of FIG. 6A showing the lid partially engaged over the open end of the enclosure partially, with the exposed pin on the enclosure extending partially into the corresponding slot on the lid.

In FIG. 6B the enclosure 1 is shown as partially engaged with the lid 10. In the cutaway portion of the collar 30 it can be seen that the pins 2 have partially entered the slots 11 on the lid 10 while also within the recesses 33 on the inside surface of collar 30. In this view the pins 2 are adjacent to the leading edge of the wedges 31. At this point, the lid 10 is in its fully open or unlocked position. As shown in FIG. 7A with the tabs 22B and 32B fully engaged with one another and cannot be further advanced in the open direction. At the same time, FIG. 7A shows the paired tabs 22A and 32A as being separated to a maximum extent and ready to receive manual pinch forces to advance the collar 30 and the wedges 31 into position between the flange 12 on the lid 1 and the load bearing surfaces 4 on pins 2.

Figure 4B:
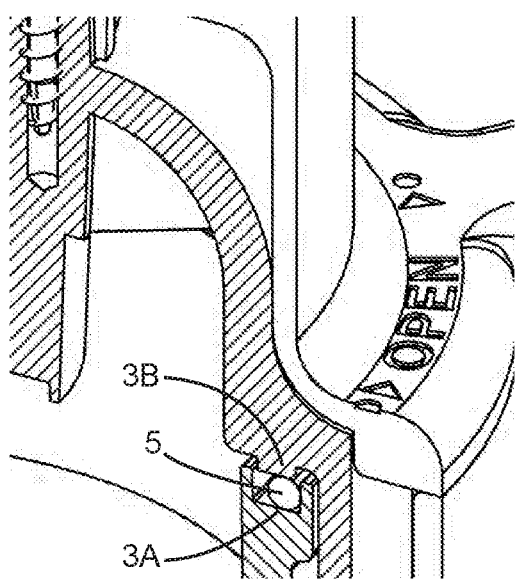
FIG. 4B is a closer view of the seats in FIG. 4A (no seal shown) with the lid and enclosure engaged to the point that the o-ring seal is in initial contact with the opposing seats on the lid and the enclosure.
Figure 4C:
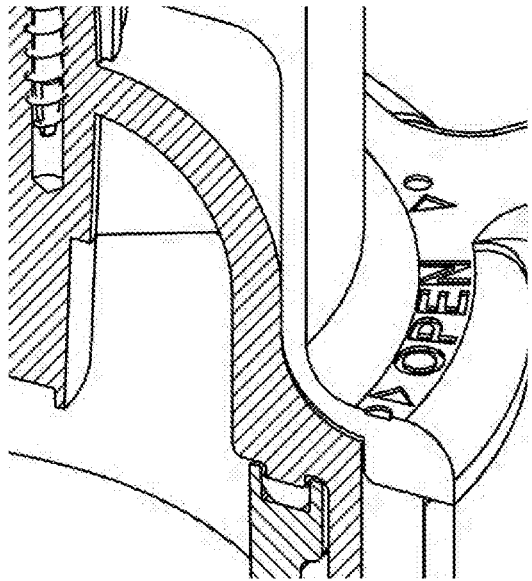
FIG. 4C is the view of FIG. 4B with the lid and enclosures fully engaged and the o-ring compressed to a predetermined extent between the opposing seats.
Figure 6C:
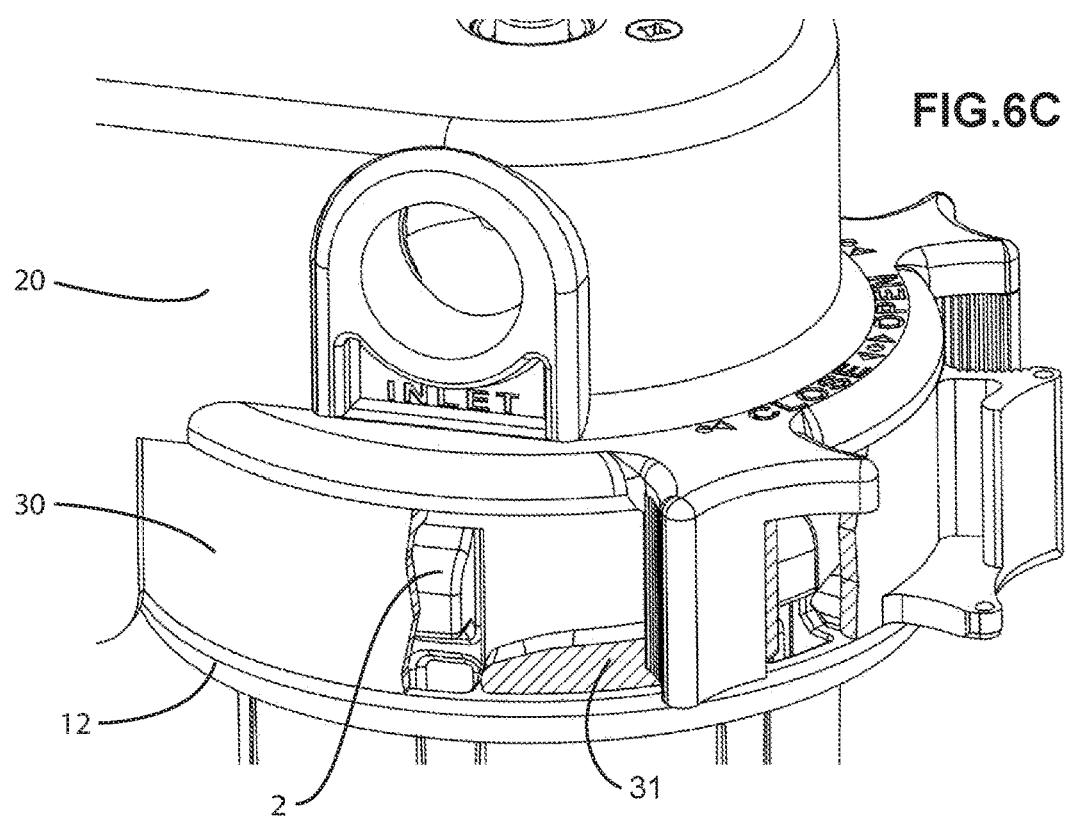
FIG. 6C is the view of FIG. 6B showing the lid fully engaged over the open end of the enclosure, with the exposed pin located fully within the corresponding slot on the lid.

Referring to FIG. 6C, the enclosure 1 is shown as having moved upward into full axial engagement with the lid 10. The pins 2 are fully within both the slots 11 and the recesses 33. At this point, the leading edge of the representative wedge 31 is: (a) level with or below the load bearing surface 4 of the corresponding pin 2 and (b) aligned for advancement between the load bearing surface 4 of pin 2 and the upper bearing surface of the flange 12 on lid 10. The paired tabs 22B and 32B remain in full contact while tabs 22A and 22B remain fully apart, as shown in FIG. 7A. As the collar 30 is rotated, each wedge 31 is advanced between the corresponding pin 2 and the flange 12. The advancing wedges 31 forcibly separate the pins 2 and the flange 12, resulting in the enclosure 1 being drawn into tight engagement with the lid 10 and seal 5 being compressed between the seat 3A on at the open end of the enclosure 1 and an extended seating surface 3B on the inside of the lid 10, as best shown in FIGS. 4B and 4C. In FIG. 4A, the seal has been omitted to provide a better view of the opposing seats 3A and 3B.

The configuration of opposing seating surfaces 3A and 3B will vary depending upon the shape and characteristics of the seal 5, the operating conditions under which the enclosure 1 is used and the dimensional relationship between the pins 2, the wedges 31 and the flange 12. As shown, the seat 3A has the standard configuration for accepting and retaining an o-ring subjected to internal pressure. The seat 3B on the lid 10 is a stepped configuration that extends into the upper portion of the seal 5 when the o-ring is under full compression. This configuration exposes the seal 5 of contact with the edges of the extended seat 3B which may provide secondary sealing lines depending upon the extent to which the o-ring is compressed. Depending on the design pressures, materials used, and degree of seal deformation required, the extended seat 3B could be converted to nothing more than a flat surface on the underside of the lid 10 and the seat 3A on the enclosure 1 could have a different depth and/or width depending on the shape of the seal 5. See, for example, the alternative forms of seals shown and discussed in relation to FIGS. 11A through 11F.

Figure 6D:
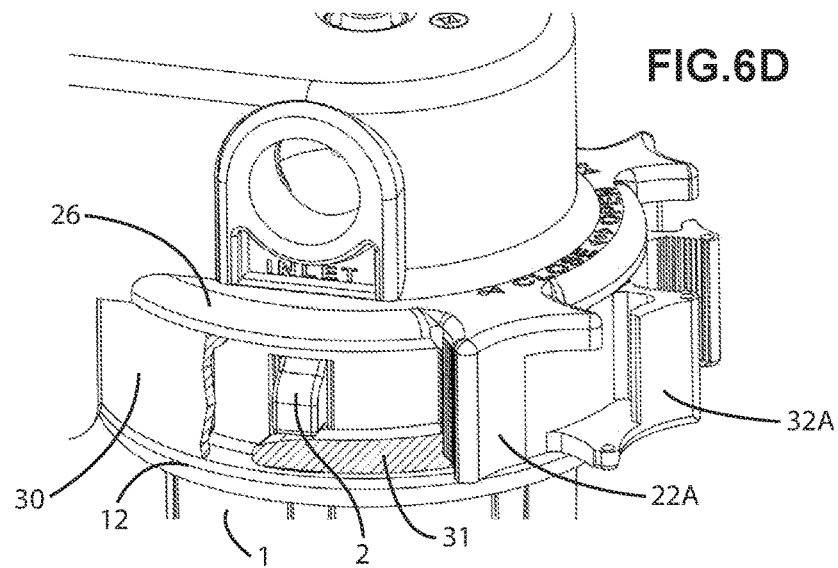
FIG. 6D is the view of FIG. 6C with the exposed wedge advanced to an initial position between the exposed pin on the enclosure and the flange on the lid.

FIG. 6D shows the collar 30 having been rotated to advance wedge 31 into an initial engagement position under pin 2. Rotation of the collar 30 is accomplished when the user manually applies a linear pinch force between the paired tabs 22A and 32A. As the tabs 22A and 32A move closer to one another in response to this pinch force, the collar 30 rotates and the wedges 31 advance between the pins 2 and the flange 12. In preferred embodiments, when the pins 2 are in their initial engagement position with wedges 31 as shown in FIG. 6D, the seal 5 is in uncompressed contact with both of the opposing seats; namely, seat 3A on the enclosure 1 and seat 3B on the inside of the lid 10. FIG. 4B shows the relative positions of the seats 3A and 3B and the seal 5 when the collar 30 and the wedges 31 are initially engaged as shown in FIG. 6D.

Figure 6E:
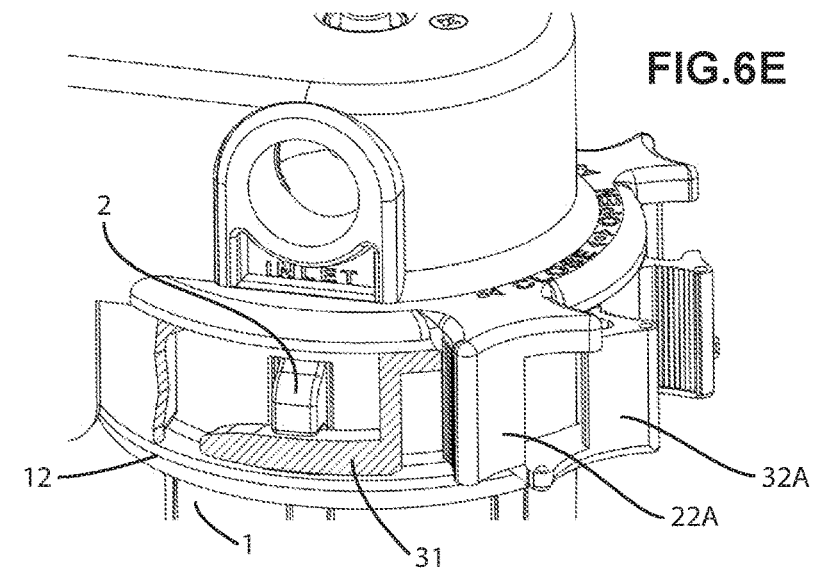
FIG. 6E is the view of FIG. 6D with the exposed wedge advanced to an intermediate position separating the exposed pin on the enclosure and the bearing surface of the flange on the lid.

FIG. 6E shows the collar 30 having been further rotated to advance the wedge 31 to an intermediate position where the pin 2 is approximately half the way up the wedge 31. This further rotation of the collar 31 has been caused by application of a further pinch force between the paired tabs 22A and 32A which have moved proportionately closer while paired tabs 22B and 32B have moved proportionately further apart. FIG. 7B shows the relative positions of the paired tabs when the wedges 31 are partially advanced in relation to the pins 2 as shown in FIG. 6E. As the wedges 31 further separate the pins 2 from the flange 12, the seal 5 is compressed and forms an increasingly improved seal between the opposing seats 3A and 3B on the enclosure 1 and the lid 10, respectively. Compare FIGS. 4B and 4C.

Figure 6F:
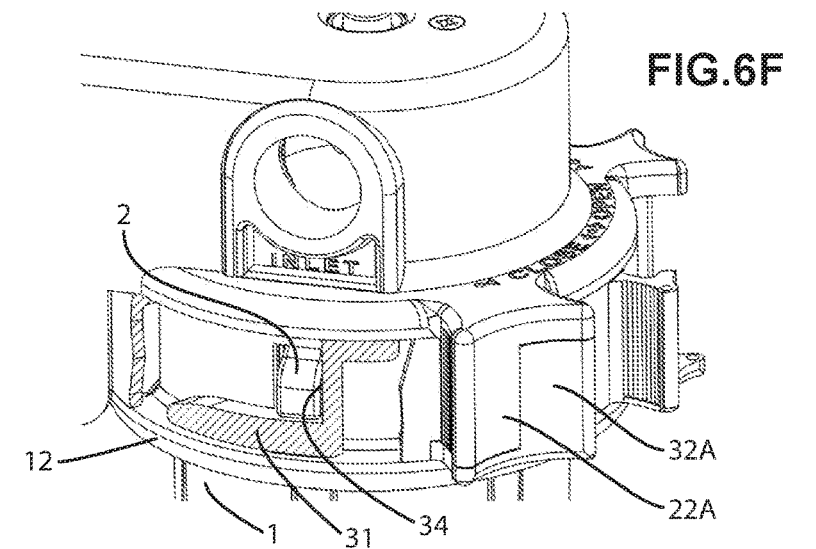
FIG. 6F is the view of FIG. 6E with the exposed wedge advanced to a maximum extent between the pin and the flange and against the stop that limits further advancement.

FIG. 6F shows the collar 30 having been rotated to advance wedges 31 into engagement with the stops 34. At this point the wedges 31 separate the pins 2 and the flange 12 by an amount that produces a predetermined crush of the seal 5 between the opposing seats 3A and 3B on the enclosure 1 and the lid 10 respectively. This condition is shown in the detail view of FIG. 4C. Further advancement of the wedge 31 and over compression of the seal 5 is prevented by the stop 34 coming into contact with the pin 2. In the fully closed position shown in FIG. 6F, the paired tabs 22A and 32A overlap in a contiguous configuration that provides a visual indication that the enclosure 1 is fully locked onto lid 10. This condition is best shown in FIG. 7C, which also shows paired tabs 22B and 32B fully separated and ready to receive lateral pinch forces that will cause the collar 30 to rotate in the opposite direction and withdraw the wedges 31 from between the pins 2 and the flange 12, allowing the enclosure 1 to be released and separated from the lid 10. Viewing FIGS. 6A through 6F in reverse order serves to illustrate the opening of the connection between the enclosure 1 and the lid 10.

It is well known that the axial compressive force that can be applied to the seal 5 will be a multiple of the force required to advance the wedges 31 through rotation of the collar 30 and that the force multiplier of the wedges 31 is inversely proportional to the angle of the wedges 31. In the absence of friction, the force multiplier is equal to the length of the wedges 31 divided by the height or axial lift of the wedges 31. The theoretical force multiplier provided by the low-angle wedges 31 is reduced (a) by friction between the wedges 31 and the pins 2 and (b) by friction between the collar 30 and the flange 12. While these friction forces are independent of the area of contact between the contacting surfaces, the coefficient of friction is primarily dependent on the materials that are in frictional contact and the relative smoothness of these contacting surfaces.

In the latest tested prototypes of the present invention, ABS (Acrylonitrile Butadiene Styrene) was used to fabricate all of the components. This is not an ideal material selection because, to minimize contact friction, the material used for the collar 30 should be different from the material used for the contacted surfaces, namely the flange 12 on the lid 10 and the pins 2 on the enclosure 1. In future prototypes and in commercial applications it is expected that the enclosure 1 and the lid 10 will be produced from polypropylene or glass filled polypropylene. It is likewise expected that the collar 30 will be manufactured from Delrin® (acetal, polyoxymethylene or POM) or from Delrin® AF (Delrin® with PTFE fibers). The frictional interaction of these materials, coupled with smooth sliding surfaces resulting from the use of selectively polished molds are expected to further lower the static and dynamic frictional forces between the collar 30 and the bearing surfaces of the pins 2 and the flange 12.

In the fields of physical therapy and ergonomics there have been many studies directed to the strength of human hands for people of different sizes, genders, ages and occupations. These studies have measured different forms of manual strength including, for example, different forms of grip and pinch strength. In the case of pinch strength, studies have quantified performance based on different placements of fingers in opposition to the thumb. The literature generally uses the term "lateral pinch" to describe the force applied between the thumb-side of the index finger in opposition to the pad of the thumb. FIGS. 7A through 7C show the paired tabs 22A and 32A (for closing) and the paired tabs 22B and 32B (for opening). These tabs are generally configured to accommodate lateral pinch forces when engaged by the human hand. These paired sets of tabs have bearing surfaces (a) that are curved to provide greater contact area with distributed force, (b) that are roughened to resist slippage and (c) that are circumferentially spaced apart within a range of maximum and minimum distances associated with optimal pinch strength as a function of pinch distance for average persons.

The seal 5 used in the latest tested prototypes of the filter housing shown in FIGS. 2 though 8 has been a buna-n rubber o-ring having a cross-sectional diameter of 0.139 inches and a circumferential diameter of approximately 3.59 inches (AS-568 NO-237). The hardness of these o-rings has been from 40 and 70 durometer (Shore A) with the preferred hardness being about 40 durometer. FIG. 11D shows a cross sectional view of a typical o-ring in a seat configured for internal pressure to the right of the o-ring shown.

For the nominal operating pressure of 100 psi associated with the filter housing of FIGS. 1 through 8, it is expected that equal or better results can be achieved when seal 5 is of a different material and/or configuration. Alternative seals may require slight modification of the seat 3A on enclosure 1 and/or seat 3B on lid 10. For example, a low hardness diamond seal of the type available from Parker Seals is expected to provide optimal performance from the perspectives of sealing capacity, pulse response, seal retention, and ease of compression. FIG. 11F includes a sectional view of a diamond seal fitted in an appropriately scaled seat.

Figure 11:
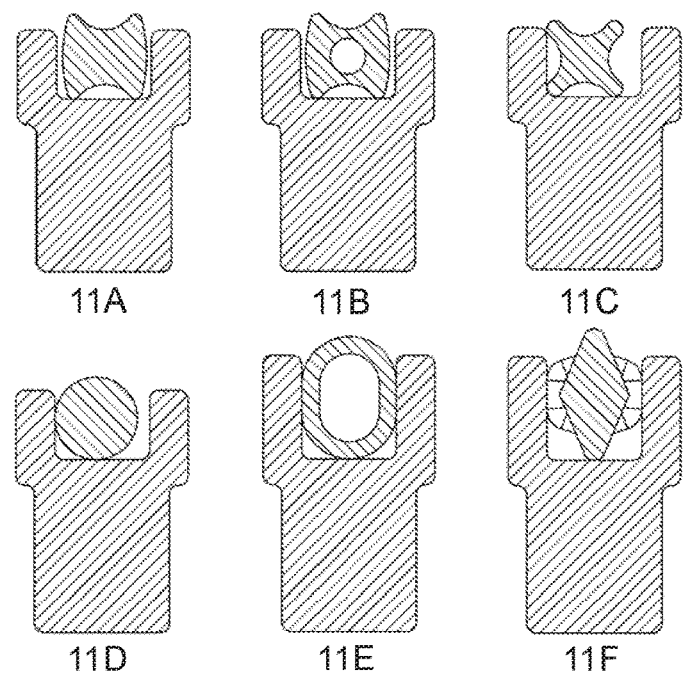

Other seal configurations such as those shown in FIG. 11 are expected to provide equal or better overall performance as compared to the o-ring, depending on the pressures and operating conditions associated with use of the enclosure 1. These alternate seal configurations include an X-shaped (or quad seal) shown in FIG. 11C and the H-shaped seal shown in FIG. 11A. Different forms of hollow seals are of particular interest in low and intermediate pressure applications and in applications involving lower pinch forces. FIG. 11E shows a cross sectional view of an annular seal retained in a narrower seat and FIG. 11B shows a hollow H-seal suitable for lower pressure applications and those involving limited compression of the seal.

FIG. 8 is a sectional view of the filter housing shown and discussed in relation to FIGS. 2 through 7. The sectional view is taken through the center of the inlet 15 and the outlet 16 and shows the various components in assembled and fully engaged relation to one another. The following key elements of the invention are shown in FIG. 8: the enclosure 1, the lid 10, the mount 20, the collar or separator 30, the pins 2, and the skirt 26 that retains the collar 30 for rotation on the flange 12. FIG. 8 also shows the assembled relation of these components to a standard filter element 50 and includes arrows indicating the pattern of flow: through the inlet 15, around and through the inlet cavity 17 in lid 10, into the enclosure 1 and around the outer surface of the filter element 50 where pressure forces the flow through sides of the filter into its hollow central core and from there through the central cavity 18 to the outlet 16.

While the container of FIGS. 2 through 8 has been described as receiving pressurized flow into inlet 15, the device will work equally well when the inlet 15 is connected to an unpressurized source and drawn through the lid 10 and enclosure 1 by a suction pump connected to outlet port 16. In this case the housing would be operating under vacuum rather than pressure and the seal 5 would be subjected to the same amount of initial deformation.

Figure 9A:
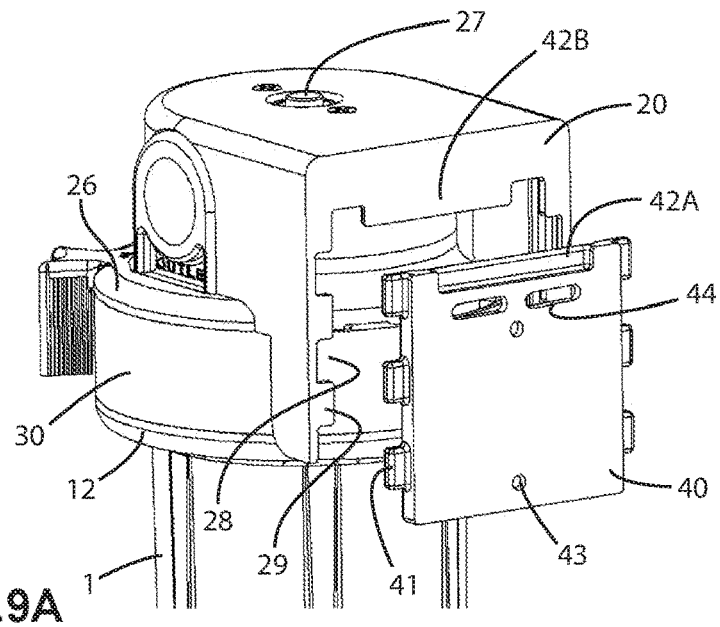
FIG. 9A is a detailed perspective view of the back side of the embodiment shown in FIGS. 2 and 3 with a wall bracket in aligned proximity to a slotted aperture through the back of the mounting structure.
Figure 9B:
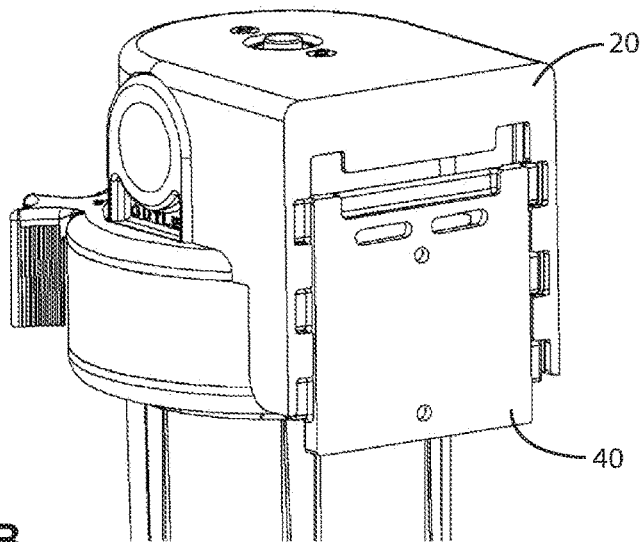
FIG. 9B shows the view of FIG. 9A with the wall bracket initially engaged within corresponding slots along the edges of the aperture through the back side of the mounting structure.
Figure 9C:
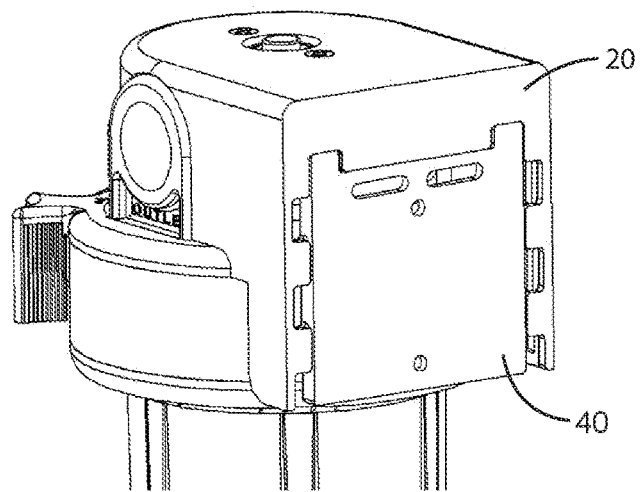
FIG. 9C shows the view of FIG. 9B with the mounting structure lowered into full locked engagement with the wall bracket.

FIGS. 9A through 9C show the manner in which the mount 20 is connected to the wall bracket 40. Referring to FIG. 9A, the wall bracket 40 includes three connection tabs 41 extending from each side. These connection tabs 41 are half the thickness of the mounting bracket 40. There is a wide recessed portion 42A along the upper edge of the bracket 40 that is also half the thickness of the bracket. The back side of the mount 20 includes a large aperture that generally corresponds to the outline of the wall bracket 40 with cutouts 28 that spatially correspond to the tabs 41 on the wall bracket 40. The back side of the mount also includes a wide tab 42B that corresponds to the recess 42A on the wall bracket 40. The material thickness of the wide tab 42B and the areas adjacent to the cutouts 28 is approximately half the thickness of the wall bracket 40. The bracket 40 also includes two holes 43 and two slots 44 to facilitate its connection to a wall or other support structure before installation of the filter housing.

As shown in FIG. 9B, the aperture in the mount 20 is initially aligned with and placed over the wall bracket 40 with the tabs 41 located in the corresponding apertures 28. At this point, the wall bracket 40 is essentially coplanar with the back of the mount 20. During installation, the mount 20 is displaced downward along the axis of the housing and the tabs 41 slide into recesses of reduced cross section along the back wall of the mount 20 while the wide tab 42B slides into and over the recessed area 42A, thereby detachably connecting the mount 20 to the wall bracket 40 as shown in FIG. 9C. The weight of the filter housing and friction between the tabs and recessed areas holds the housing firmly in place. Twisting and turning forces on the wall bracket 40 are minimal because the enclosure 1 is connected to and disconnected from the lid 10 with zero net torque resulting from the application of equal and opposite forces between the paired tabs (22A-32A and 22B-32B).

Figure 10A:
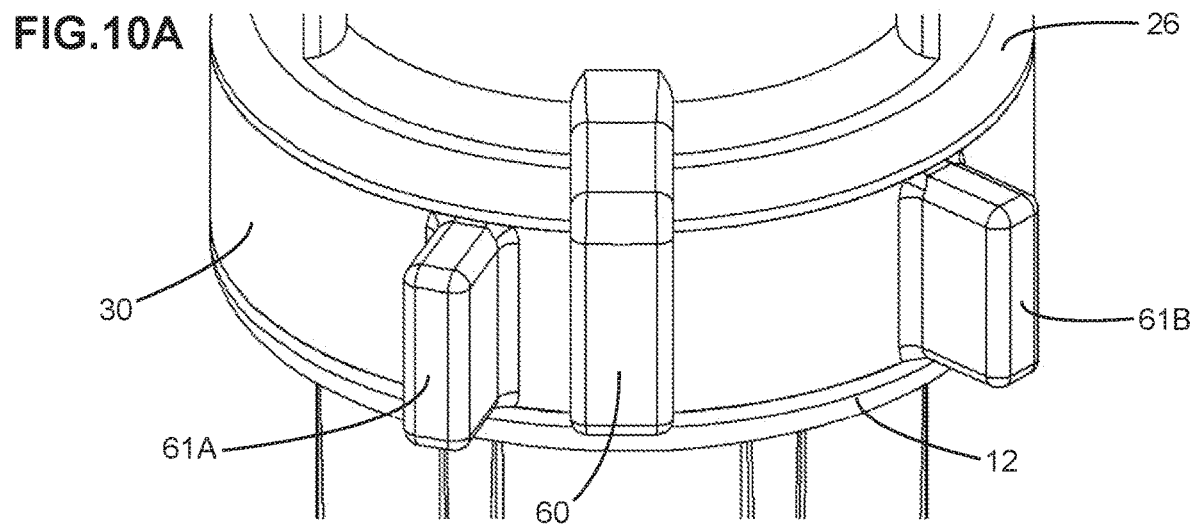
FIG. 10A is a modified detailed view of the embodiment shown in FIGS. 2 and 7 with the mounting structure having only one protrusion for receiving lateral pinch forces in selective opposition to the two protrusions extending from the separator.

FIGS. 10A through 100 show an alternative arrangement of pinch tabs for use in rotating the collar 30 and moving the wedges 31 between their open and closed positions. As shown in FIG. 10A, the mount 20 includes a single protrusion or tab 60 that extends radially outward from the mount 20 and over the collar 30. The collar 30 has two spaced-apart protrusions or tabs 61A and 61B. FIG. 10A shows the paired tabs 60 and 61A after having been pinched together to their fully open position which corresponds to the wedges 31 being fully disengaged between the pins 2 and the flange 12 (as shown in FIG. 6B).

Figure 10B:
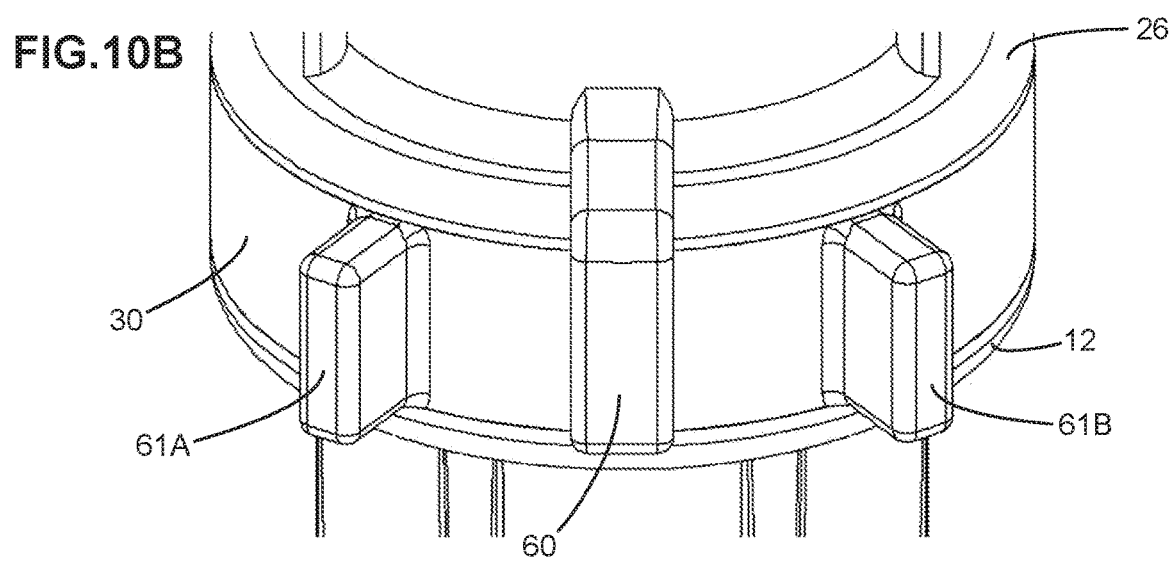
FIG. 10B is the view of FIG. 10A with the protrusions shown in their intermediate positions depicted by the wedge location in FIG. 6E.
Figure 10C:
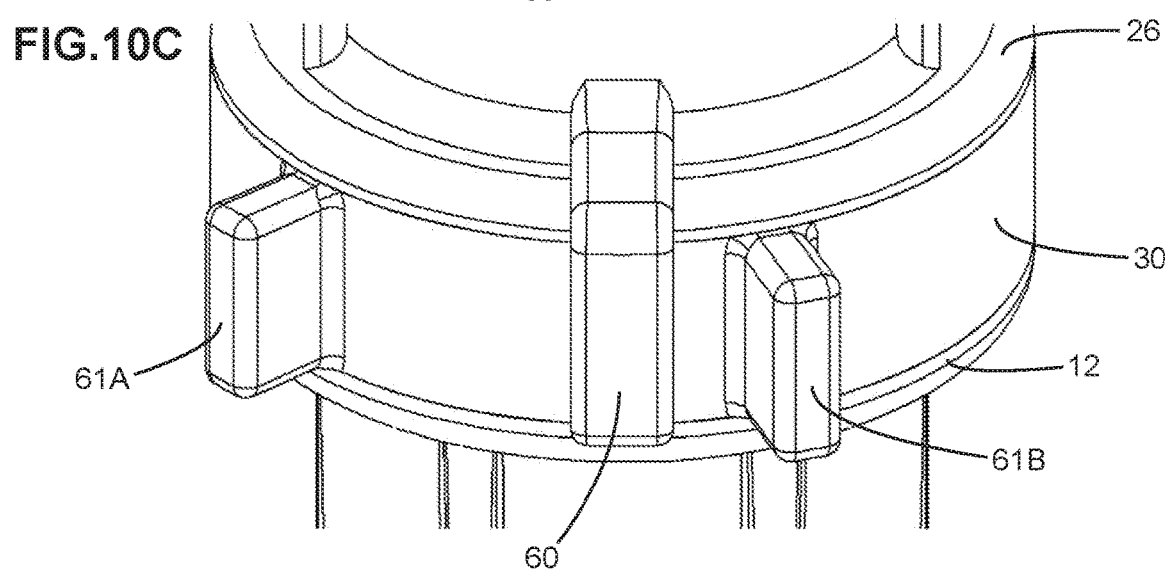
FIG. 10C is the view of FIG. 10B with the protrusions shown in their fully closed positions as depicted by the location of the wedge in FIG. 6F.

FIG. 10B shows the tabs 61A and 61B about equal distant from the single tab 60. This position corresponds to the wedges 31 being engaged about half way between the pins 2 and the flange 12 (as shown in FIG. 6E). FIG. 10C shows the paired tabs 60 and 61B in their closest fully closed position corresponding to wedges 31 being fully engaged from under the pins 2 (as shown in FIG. 6F). A further alternative arrangement of the pinch tabs would place a single tab on the collar 30 and two spaced-apart tabs on the mount 20.

As shown and further discussed in relation to FIGS. 13 and 14, the mount 20 shown in FIGS. 2 through 8 may assume many different forms in connecting the tabs (22A and 22B) to the lid 10. In the simplest embodiment shown in FIG. 10, the tab 60 may be connected to the lid 10 by means of any form of axial joint that resists circumferential pinch forces. For example the lid 10 could be molded with a square pin extending upward from its surface above the slots and the tab 60 could be separately molded with a corresponding square hole in the bottom. The tab 60 would thus include an integral mount and would be connected to the lid 10 by sliding the square hole in the tab 60 down onto the square pin extending from the lid. The square pin in the square hole would prevent rotation from application of opposing forces between the tab 60 when pared with the other tabs 61A and 61B on the collar 30. Other alternative forms of mounts are shown in FIG. 13 (mount 70), FIG. 14A (mount 80) and FIG. 14B (mount 90).

In many applications it is necessary to process fluid through different kinds of filters to remove different materials. In such multi-stage applications a series of two or more filter housings containing different filter elements are connected in series. Serial connection means that the outlet from a first housing is connected to the inlet of a second housing. The housing of the present invention is particularly useful in multi-stage filter applications as shown in FIG. 12. In the illustrated example the pinch tabs extend from the same side of both filter housings; however, as discussed in relation to FIG. 4A, the mount 20 on one of the adjacent housings can be easily disconnected from the corresponding lid 10, rotated 180 degrees and reconnected to the lid. This will serve to relocate the pinch tabs on alternating sides of serially connected housings.

The filter housing of FIGS. 2 through 8 was designed to accommodate standard 10 inch filter elements; however, the enclosure 1 could be made longer to accommodate standard 20 inch filters without modification of the remaining components. The advantage of a larger filter is greater filtration capacity and less frequent filter changes for any given application and volume of treated flow. In cases where a greater volume or rate of flow must be accommodated, two or more filter housings of the type shown in FIGS. 2 through 8 can be connected in parallel. Parallel connection means that the inlets of two or more housings are connected to the same source of pressurized fluid and the outlets from these housings are connected in fluid communication with a common point of use.

Many consumers seek to install drinking water filtration systems in their homes but find it difficult to access existing plumbing or to find sufficient under-counter space to accommodate or provide ready access to a filter housing. In these cases countertop filter housings provide a workable option. FIGS. 13A through 13C show the filter housing of FIGS. 2 through 8 that has been modified by replacing the mount 20 and wall bracket 40 with a counter mount 70 and doing so without changing any of the other components. The counter mount 70 is inexpensive, easily manufactured and suitable for supporting the FIG. 2 filter housing in an inverted position on a horizontal surface. The counter mount 70 has a relatively large diameter base to provide stability. The counter mount 70 attaches to the distributor/lid 10 in exactly the same way that the mount 20 is connected (as shown in FIG. 4A), using the same combination of holes 21, screws 23, bosses 13 and bores 24. As shown in FIGS. 13A and 13B, the enclosure 1 may include an optional pressure relief valve 27. This optional valve is the same as valve 27 shown in FIGS. 1, 2 and 8, except that it would be incorporated by drilling out an otherwise closed aperture 19 at the closed end of enclosure 1 (see FIG. 8). The countertop version of the present invention would be installed with a faucet 71 controlled by a valve 72 connected to the outlet 16 from the distributor/lid 20. Typically, a small diameter tube from the source of pressurized water would be connected through an adaptor 73 to the inlet 15 on the distributor/lid 20.

FIGS. 14A and 14B illustrate two alternate embodiments of the filter housing described in relation to FIGS. 2 through 8 in which the mount 20 is replaced by a mount that is simpler, more compact and uses less material, while all other elements of the FIG. 2 housing remain the same. The mount 80 of FIG. 14A includes only the structural elements required to support the two protruding tabs 82A and 82B together with the simple integrated wall bracket 83. The mount 90 of FIG. 14B is the same as mount 80, except that it does include a wall bracket. These alternative embodiments are particularly useful in applications where filter housings are connected in serial and/or parallel clusters for high flow and/or in technically complex multi-phase filtration systems, where concurrent filter changes can be very rapidly accomplished without the use of tools and with minimum down time for the filtration system.

The container of the present invention has been shown and described in the form of a quickly detachable enclosure for the sealed containment of a replaceable filter element in the directed flow of a fluid, while the basic elements of the invention may be incorporated into other forms of sealed containers requiring periodic manual detachment or disassembly without the use of tools.

The subject matter of the present invention is defined by the following claims.

The invention claimed is:

1. A detachably sealed container for receiving and supporting a replaceable filter element within a fluid flow, comprising in combination:
    (a) a lid structure including a distributor for receiving incoming fluid and directing the flow thereof for filtration and use, said lid including
        (i) a plurality of slots for receiving a corresponding plurality of pins,
        (ii) a flange for receiving compressive forces transmitted in opposition to said pins,
        (iii) a first seat for engaging a seal and for compressing said seal in response to axial forces transmitted between said pins and said flange;
    (b) a mounting structure connected to said lid, said mounting structure including at least one protrusion for receiving forces in opposition to substantially equal forces applied to a functionally paired protrusion on a displaceable separator;
    (c) an enclosure having an open end and being adapted to receive and support a removable filter element, said enclosure including
        (i) a plurality of pins corresponding to and oriented for engagement within the corresponding plurality of slots on said lid,
        (ii) a second seat around the open end of the enclosure for compressing said seal in opposition to said first seat, said second seat corresponding to said first seat;
        (iii) means cooperating with said distributor for receiving and directing the flow of said incoming fluid through a filter when fitted within said enclosure; and,
    (d) said displaceable separator including
        (i) at least one radial protrusion functionally paired with the at least one protrusion on said mounting structure, said paired protrusions adapted to receive opposing forces to displace said separator in a first direction relative to said mounting structure,
        (ii) at least another radial protrusion functionally paired with at least another protrusion on said mounting structure, said paired protrusions adapted to receive opposing forces to displace said separator in a second direction relative to said mounting structure,
        (iii) a plurality of wedges having substantially the same predetermined height, angle and length and being configured for selective engagement between corresponding pins on said enclosure and the flange on said lid when said pins are substantially within the corresponding slots on said lid; and,
    (e) said seal is a deformable seal engaged between said first and second seats;
    whereby (i) said seal is compressed when the seats are drawn together as the wedges are advanced between the pins and the flange in response to displacement of said separator in said first direction and (ii) said seal is released when the seats are allowed to disengage as the wedges are withdrawn from between the pins and the flange in response to displacement of said separator in said second direction.

2. The container of claim 1 wherein the opposing force on each pair of protrusions required for producing a substantial seal against fluid leakage between said seats is less than the lateral pinching force produced by the dominant hand of an average human user of the container.

3. The container of claim 1 wherein the opposing force on each pair of protrusions required for producing a substantial seal against fluid leakage between said seats is less than about 26 pounds and wherein the compressibility of said seal is less than or equal to the compressibility of a rubber O-ring having a Shore A hardness of between about 30 and 50 durometer.

4. The container of claim 3 wherein the opposing force on each pair of protrusions required to provide a substantial seal between the seats is less than about 20 pounds.

5. The container of claim 3 wherein the opposing force on each pair of protrusions required to provide a substantial seal is less than about 20 pounds and the seal has a cross sectional configuration selected from the group of shapes including circular, diamond-shaped, quad-shaped, hollow or annular.

6. The container of claim 1 wherein the mounting structure is adapted for connection to the distributor in at least two predetermined orientations.

7. The container of claim 2 wherein the mounting structure further includes a bracket to secure the container to a stationary surface.

8. The container of claim 2 wherein the mounting structure further includes a base for supporting the container on a generally horizontal surface.

9. The container of claim 2 wherein engagement of the wedges between the pins and the flange is mechanically limited at a point where the seal has been compressed to a predetermined extent.

10. The container of claim 2 wherein the distributor further includes means for separately receiving and conveying the flow of filtered fluid from the enclosure for use outside the container.

11. A method for using the container of claim 1, including the steps of:
    (a) connecting the distributor in fluid communication between a pressurized source of fluid and a point requiring filtered fluid;
    (b) installing a replaceable filter within the enclosure;
    (c) engaging the pins on the enclosure within the corresponding slots on the lid with the seal between said first and second seats;
    (d) applying manual force between at least one set of paired protrusions on said mounting structure and said displaceable separator to advance the wedges on said separator between the pins on said enclosure and the flange on said lid to bring the first and second seats into closer proximity; and
    (e) further advancing the wedges until the seal has been compressed between the first and second seats by the amount required to achieve the desired seal against substantial leakage between said first and second seats of the container.

12. The method of claim 11 including the further steps of:
    (f) applying manual force between at least one other set of paired protrusions on said mounting structure and said displaceable separator to withdraw the wedges from between the pins and the flange; and,
    (g) disengaging and separating the pins on the enclosure from the slots on the lid to provide access to the replaceable filter element within the enclosure.

13. The method of claim 12, including the further steps of:
    (h) removing and replacing the filter element within the enclosure; and,
    (l) repeating the steps (b) through (e).

14. A detachably sealed container comprising in combination:
- (a) a lid structure including
  - (i) a plurality of slots for receiving a corresponding plurality of pins,
  - (ii) a flange for receiving compressive forces in opposition to said pins,
  - (iii) a first seat for engaging a seal and for compressing said seal in response to forces transmitted between said pins to said flange;
- (b) a mounting structure connected to said lid, said mounting structure including at least one protrusion for receiving pinch forces in opposition to substantially equal pinch forces applied to a functionally paired protrusion on a displaceable separator;
- (c) an enclosure having an open end and including
  - (i) a plurality of pins corresponding to and oriented for engagement within the corresponding plurality of slots on said lid,
  - (ii) a second seat around the open end of the enclosure for compressing said seal in opposition to said first seat, said second seat corresponding to said first seat;
- (d) said displaceable separator including
  - (i) at least one protrusion functionally paired with the at least one protrusion on said mounting structure, said paired protrusions adapted to receive opposing forces to displace said separator in a first direction relative to said mounting structure,
  - (ii) at least another radial protrusion functionally paired with at least another protrusion on said mounting structure, said paired protrusions adapted to receive opposing forces to displace said separator in a second direction relative to said mounting structure,
  - (iii) a plurality of wedges having substantially the same predetermined rise, angle and length and being configured for selective engagement between corresponding pins on said enclosure and the flange on said lid when said pins are substantially within the corresponding slots on said lid; and,
- (e) said seal is a deformable seal engaged between said first and second seats;
- whereby (i) said seal is compressed when the seats are drawn together as the wedges are advanced between the pins and the flange in response to displacement of said separator in said first direction and (ii) said seal is released when the seats are allowed to disengage as the wedges are withdrawn from between the pins and the flange in response to displacement of said separator in said second direction.

15. The container of claim 14 wherein the opposing force required for producing a substantial seal against fluid leakage between said seats is less than the lateral pinching force produced by the dominant hand of an average human user of the container.

16. The container of claim 14 wherein the opposing force required for producing a substantial seal against fluid leakage between said seats is less than about 26 pounds and wherein the compressibility of said seal is less than or equal to the compressibility of a rubber O-ring having a Shore A hardness of between about 30 and 50 durometer.

17. The container of claim 16 wherein the opposing force required to provide a substantial seal is less than about 22 pounds.

18. The container of claim 17 wherein the seal has a cross sectional configuration selected from the group of shapes including circular, diamond-shaped, quad-shaped, hollow or annular.

19. The container of claim 14 wherein advancement of the wedges between the pins and the flange is mechanically limited to a point where the seal has been compressed to a predetermined extent.

* * * * *